S. MILLER.
Cotton-Planter.
No. 9,676.　　　　　　　　　　　　　　　　Patented Apr. 19. 1853.
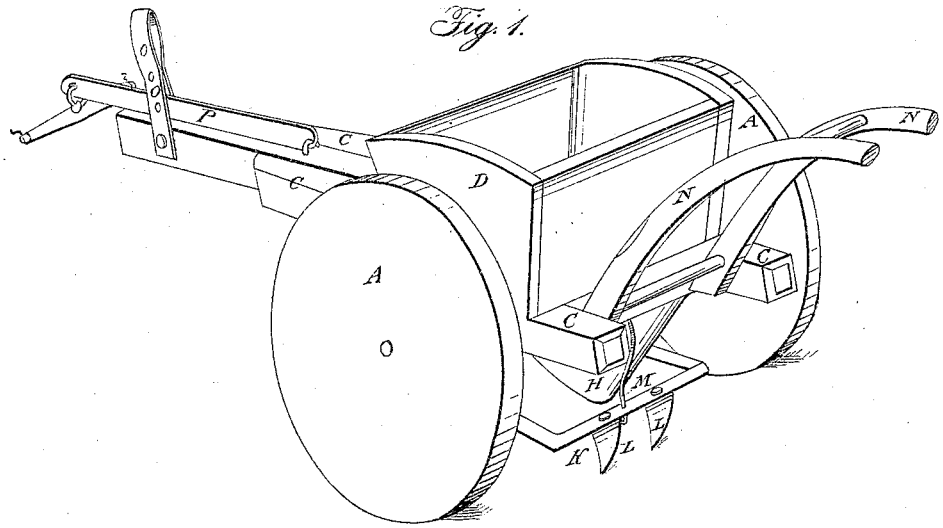
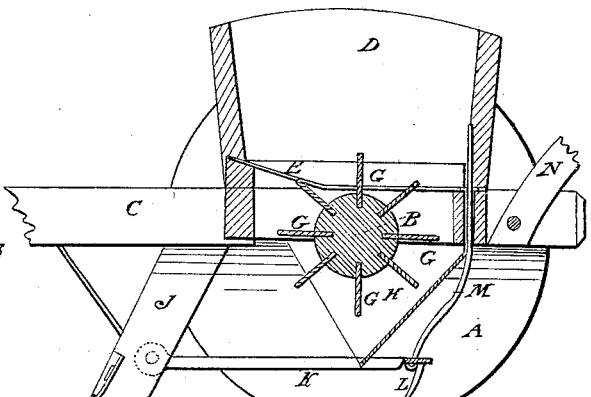
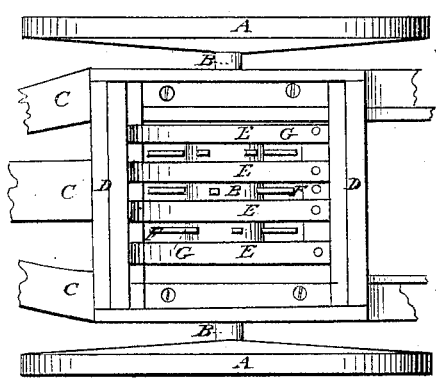

UNITED STATES PATENT OFFICE.

SAMUEL MILLER, OF WASHINGTON COLLEGE, TENNESSEE.

IMPROVEMENT IN COTTON-SEED PLANTERS.

Specification forming part of Letters Patent No. 9,676, dated April 19, 1853.

*To all whom it may concern:*

Be it known that I, SAMUEL MILLER, of Washington College, in the county of Washington and State of Tennessee, have invented certain new and useful Improvements in Machines for Planting Cotton-Seed; and I do hereby declare the following to be a full, clear, and exact description of the same, reference being had to the accompanying drawings, making a part thereof, in which—

Figure 1 represents a perspective view of the machine; Fig. 2, a vertical longitudinal section through the machine, and Fig. 3 a top view.

Similar letters in the several figures represent the same parts.

The difficulty which has heretofore existed in planting cotton-seed by machines arises from the fact that so much of the fiber of the cotton adheres to the seed as to prevent it from running through any openings or cells which may be provided for carrying it out of the hopper.

The nature of my invention consists of forming the bottom of the hopper of slats or ribs, leaving space enough between them for the spikes or teeth which are arranged on the axle to pass up into the hopper, and by their revolving motion to catch and draw out the seeds between the slats or ribs, whence they fall into a hopper or guide and pass down into the furrow opened by a plow attached to said machine in front, and are covered by two small wing-plows attached to the rear of the machine.

To enable others skilled in the art to make and use my machine, I will proceed to describe the same with reference to the drawings.

The wheels A are securely attached to the axle B, so as to make said axle revolve with them. A suitable frame, C, is then fixed on the axle, on which is built the hopper or seed-box D, built in any of the usual forms, but having the bottom made of ribs or slats E, placed at suitable distances apart, so as to leave openings F, through which the teeth or spikes G, arranged on the axle, may pass for the purpose of drawing or forcing the seed out of the hopper or seed-box. After the seeds are drawn out of the hopper they fall upon a guide or hopper, H, arranged underneath the frame, and which conveys them into a furrow opened by the plow I, arranged on a stock, J, in the fore part of the machine.

On a curved hanging bar, K, which is attached to the stock J so that it may be raised or lowered, are arranged the two shovel-plows L, which straddle the furrow opened by the plow I and throw the earth back into said furrow, covering up the seed distributed therein.

The hanging bar K is provided with a rod, M, which may pass up to any convenient place where the operator may catch it, so as to draw the covering-plows up and stop their operation.

N are the handles attached to the rear of the frame for guiding and controlling the machine.

A clevis, O, and drag-bar P may also be arranged for adjusting the plow to the proper depth of furrow and for drawing it forward by horses, &c.

Having thus fully described my invention, what I claim therein as new, and desire to secure by Letters Patent, is—

The combination of the open or latticed bottom of the seed-hopper with the teeth on the axle passing through them into said hopper, for the purpose of drawing or forcing out the seed so that they may be drilled into the ground, the whole being arranged in the manner and for the purpose herein described.

SAML. MILLER.

Witnesses:
J. S. SMITH,
I. F. WOLLARD.